May 20, 1952   J. L. PETTUS   2,597,176
FILM SUPPLY AND TAKEUP APPARATUS
Filed Dec. 22, 1949   2 SHEETS—SHEET 1

INVENTOR.
James L. Pettus
BY
ATTORNEY

May 20, 1952 J. L. PETTUS 2,597,176
FILM SUPPLY AND TAKEUP APPARATUS
Filed Dec. 22, 1949 2 SHEETS—SHEET 2

INVENTOR.
JAMES L. PETTUS
BY
ATTORNEY

Patented May 20, 1952

2,597,176

UNITED STATES PATENT OFFICE 2,597,176

FILM SUPPLY AND TAKE-UP APPARATUS

James L. Pettus, Encino, Calif., assignor to Radio Corporation of America, a corporation of Delaware Application December 22, 1949, Serial No. 134,555

7 Claims. (Cl. 88—17)

This invention relates to motion picture film equipment and particularly to a film magazine and a light trap therefor.

In motion picture cameras and sound recorders, it is common practice to house the supply and takeup reels within a light-tight magazine which may be threaded in the darkroom with the film passing across a light trap where the film passes from a supply reel out of the magazine and into the magazine to the takeup reel. When the magazine is attached to a picture camera or sound recorder, this accessible film portion is pulled into a loop which is threaded through the camera or recorder. The camera is then closed, and the film is then exposed at the picture aperture or at the sound translation point. The usual type of magazines hold a supply of film or rolls of a length usually under one thousand feet, and there has been no difficulty in advancing the film from and into the magazine. With the advent of kinescope recording in television shows, it has been found that larger film reels and magazines are desirable to provide a continuous recording for long periods of time. With the present magazine constructions, difficulty has been encountered in winding up the large amount of film on the takeup reel. This difficulty has been caused chiefly by the light trap friction, so that the film is not advanced onto the takeup reel as the diameter of the roll becomes very large. Even when the torque on the takeup reel was increased beyond a safe point, the film would not pass properly through the trap and wind onto the takeup reel when the roll reached a large size.

The present invention has solved the problem, one modification being satisfactory for moderately sized rolls of film, and the second modification serving for exceptionally large film rolls, each modification actually driving the film to the point of contact with the outer turn of the film on a takeup reel. Thus, the normal amount of torque may be applied to the takeup reel, and the film will be properly wound thereon. The first modification utilizes the energy of film motion out of the magazine to aid the film to enter the magazine by the use of a transfer roller in the trap contacting the film at both points. The second modification utilizes exterior energy applied to the trap roller which can be done since the film is passing out of and into the magazine at the same uniform rate of speed, although the angular speed of the reels and rolls varies with the diameter of the rolls at any instant. The transfer or light trap roller is provided with a resilient tire to insure the necessary traction between it and the film.

The principal object of the invention, therefore, is to facilitate the supplying and takeup of film from and to large film reels.

Another object of the invention is to provide an improved film magazine and light trap.

A further object of the invention is to provide a film magazine of large capacity with a light trap adapted to aid the passage of the film into the magazine and to the takeup reel.

A still further object of the invention is to provide a film magazine and light trap having a positive film advancing drive in the light trap.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
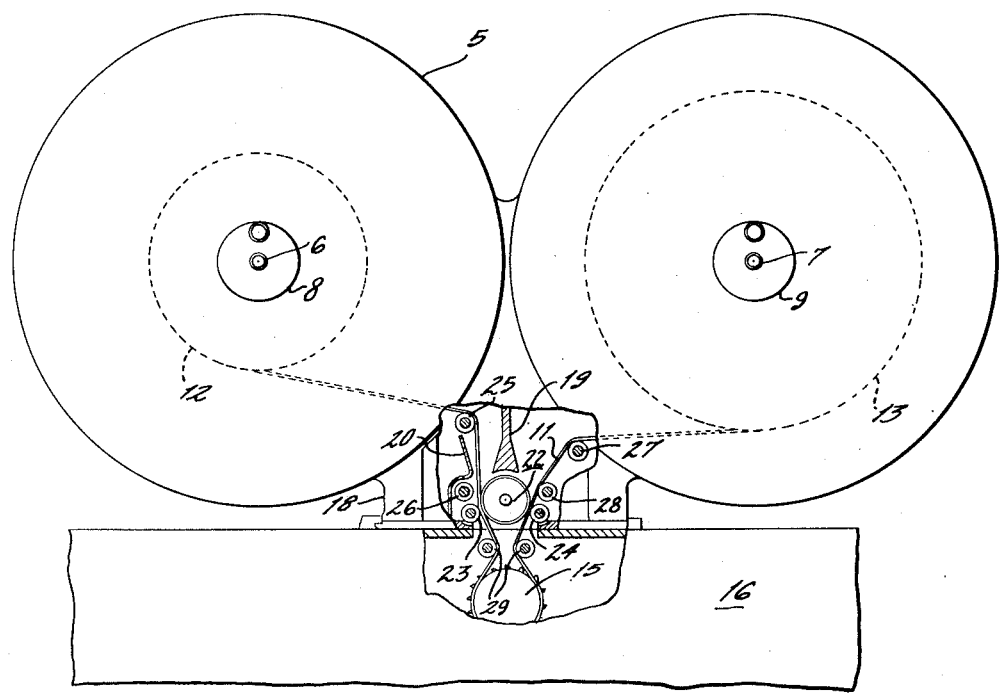
Fig. 1 is an elevational view of a film magazine and light trap embodying the invention.
Figure 2:
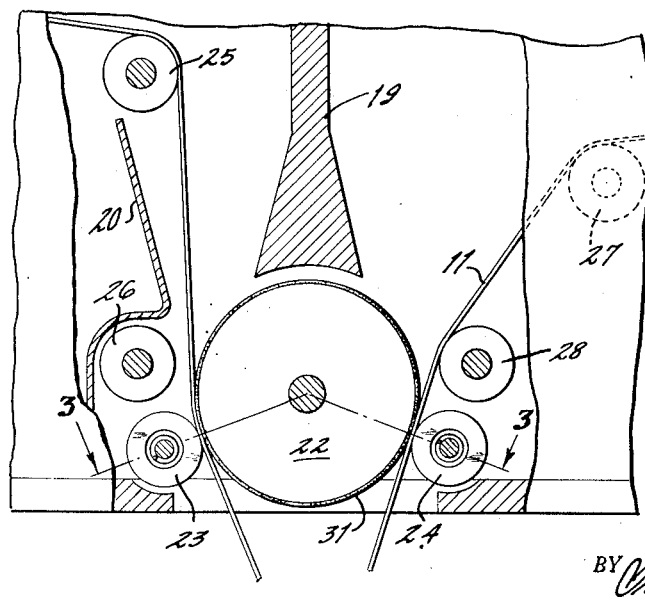
Fig. 2 is an enlarged view of the light trap portion of the magazine shown in Fig. 1.

Referring now to the drawings, in which the same numerals identify like elements, a magazine is composed of a housing 5 having spindles 6 and 7 with film hubs 8 and 9, on which a film 11 is advanced from a roll 12 to a roll 13 by a sprocket 15, which may be in a picture camera or sound recorder 16. The magazine casing has a neck portion 18 which may be attached to the camera 16 and in which is housed a dividing partition 19 and a film threading guide 20. To eliminate light from the interior of the magazine, a large roller 22 is provided, together with auxiliary rollers 23 and 24. Four other rollers are also utilized, such as 25, 26, 27, and 28, for the purpose of threading the film through the trap, a pair of film guiding rollers 29 being shown in the camera or recorder. To thread the film from the supply roll 12 through the trap, the end is placed between the roller 25 and the partition 19 and pushed downwardly, the guide 20 directing it between the rollers 22 and 23, the roller 26 insuring that the film does not bend back into the pocket between the roller 23 and the shield 20. To thread the film back into the magazine, the end is placed between the rollers 22 and 24, and then pushed upwardly over roller 28 and over roller 27 and attached to hub 9.

Figure 3:
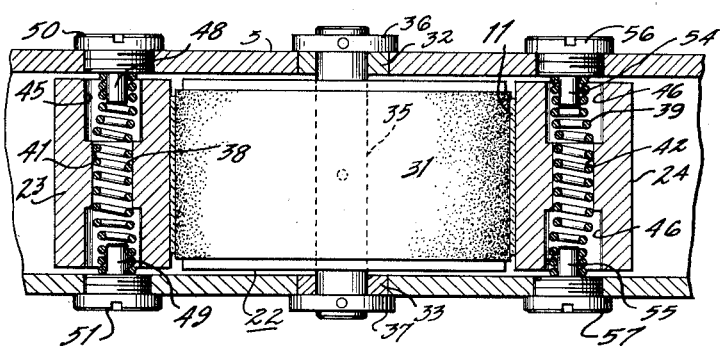
Fig. 3 is a cross-sectional view of the light trap taken along the line 3—3 of Fig. 2.
Figure 4:
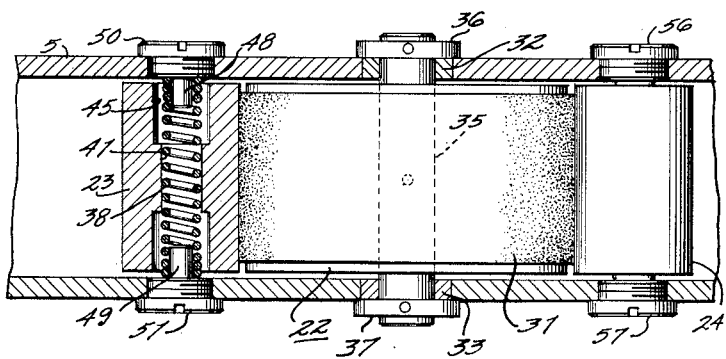
Fig. 4 is a cross-sectional view, similar to Fig. 3.

The roller 22 is provided with a groove in which there is a resilient tire 31 extending beyond the shoulders of the roller, this tire being of resilient material, such as neoprene rubber. (See Figs. 3 and 4.) The roller is mounted for rotation in bearings 32 and 33 on an axle 35, and held in position by pinned collars 36 and 37. The two rollers 23 and 24 are adjustable laterally on axles composed of coiled springs 38 and 39, which have the same outside diameter as the internal diameter of the central portions 41 and 42 of the rollers 23 and 24, respectively, and which pass into larger diameter end openings 45 and 46, respectively. The ends of the springs are mounted on stub shafts, spring 38 being mounted on shafts 48 and 49 of screws 50 and 51 threaded into the casing 5, while spring 39 is mounted on stub shafts 54 and 55 of screws 56 and 57, respectively. As shown in Fig. 3, the trap is shown with the film 11 therein and the displacement of the axes of rollers 23 and 24 with respect to the axes of the stub shafts 48—49 and 54—55 is shown, this displacement causing a predetermined pressure to be applied to the film to hold it against the resilient tire 31. Good traction, therefore, between the film and tire or roller is obtained.

In operation with a camera or sound recorder, the sprocket 15 is driven and the film is pulled from the roll 12 and is taken up on the roll 13. If sufficient power is applied to the takeup reel to overcome the friction in the light trap and take up the film when the roll has become very large, there is danger of injuring the film when the roll is of small diameter. If this takeup reel power is within safe limits, the film may not be wound on the reel. However, by aiding the film through the trap toward the takeup reel, this problem is solved. In the present magazine, a certain rotational torque is applied to the roller 22 by the outgoing film loop between the rollers 22 and 23, which, in turn, advanced the film into the magazine when it passes between roller 22 and roller 24. In most instances, this amount of power transfer has been sufficient to provide proper and safe winding of the film on roll 13.

Figure 5:
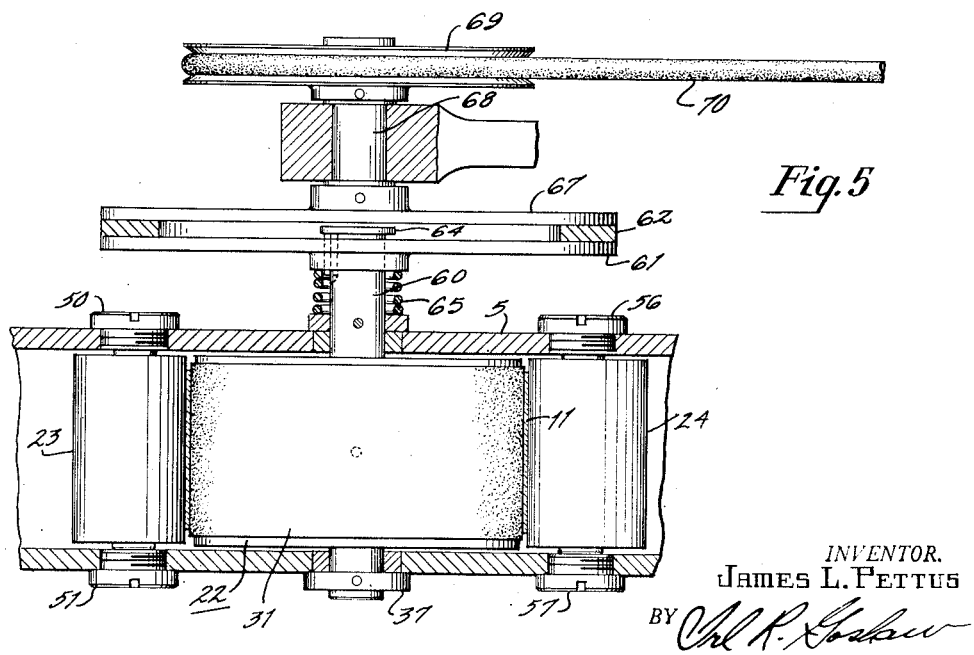
Fig. 5 is a cross-sectional view of a light trap showing the application of auxiliary power thereto.

However, for extremely large reels, it is desirable to provide external power to the roller 22, as shown in Fig. 5. In this modification, the roller 22 is provided with an extended shaft 60 on the end of which is positioned a disc 61. The disc 61 is positioned between a holding disc 64 and a coiled compression spring 65. Facing the disc 61 when the magazine is in position on a camera or recorder, is a second disc 67 having a friction pad 62 adapted to contact the face of disc 61 and which is mounted on an axle 68 carrying a pulley 69. The pulley 69 may be belted by belt 70 to either the film driving mechanism of the camera or recorder, or it may be belted to a small auxiliary motor operating at the proper rotational speed to drive the roller 31 in synchronism with the sprocket 15.

When the magazine is in position on the camera recorder, there is a predetermined amount of pressure on the pressure pad 62 produced by the tension in the spring 65. When the magazine 5 is removed, the disc 61 is held in position on the shaft 60 by holding disc 64 attached to the end of the shaft. In this manner, the magazine may be attached and detached from the camera or recorder as readily as before, while the power supplied to the roller 22 will aid the film in leaving the magazine and entering it for winding on the takeup reel. The external energy permits extremely long lengths of film to be continuously and uniformly supplied and taken up over long periods of time.

In addition to the clutch providing a means of applying auxiliary power to the roller 22, the clutch disc 61 is used in threading the film through the magazine. That is, when the end of the film is inserted into the trap, the roller 22 may be turned or rotated by hand by grasping the disc 61. The threading operation occurs in the darkroom, and by being able to rotate the roller 22, the film may be easily threaded out through the trap and into the magazine.

I claim:

1. A light trap and film driving energy transfer mechanism for a film magazine having supply and takeup reels, comprising a large central roller at the exit and entrance points of film from and to said magazine, a roller on each side of said central roller and adapted to contact said central roller when no film is between them, means for tensioning said pair of rollers toward the axis of said central roller, said pair of rollers pressing said film against said central roller when said film is between said central roller and said pair of rollers, and high traction resilient material on said central roller for providing driving traction between said film and said central roller when said film is pressed against said means by said pair of rollers.

2. A light trap and film driving energy transfer mechanism for a film magazine in accordance with claim 1, in which said tensioning means for said rollers on each side of said central roller is a spring shaft extending through said rollers and on which said rollers are mounted, said rollers being placed under tension of said shafts when said film is passed between said rollers and said central roller.

3. A light trap and film driving energy transfer mechanism for a film magazine in accordance with claim 1, in which means are provided for supplying external power to rotate said central roller.

4. A light trap and film driving energy transfer mechanism adapted to aid the entrance of film into a film magazine, comprising a light trap mechanism at the film entrance to and from said magazine from and to which a film is advanced by a continuous sprocket, said mechanism having a central partition, a large central roller between said partition and the opening to and from said magazine, said roller having thereon a high traction covering for transferring energy between said film and said large roller, a roller on each side of said central roller to exclude light at the film exit and entrance points between said central roller and said magazine, and means for resiliently mounting said rollers on the sides of said central roller to bring pressure on said film on said central roller when film is between said large central roller and said other rollers, said other rollers contacting said large central roller when no film is between said rollers.

5. A light trap and film driving energy transfer mechanism in accordance with claim 4, in which said resilient mounting for said pressure rollers includes coil spring axles and stub shafts for the ends of said spring axles, said rollers being transversely movable on said springs with respect to said stub shafts toward the axis of said central roller.

6. A light trap and film driving energy transfer mechanism in accordance with claim 4, in which are provided a shaft for said central roller, a clutch disc on said shaft, a cooperating clutch disc, a shaft for said cooperating disc, and means for driving said last mentioned shaft to provide the surface of said central roller with the same speed as the surface of said sprocket.

7. A light trap and film driving energy transfer mechanism for a film magazine attachable to film advancing mechanism having a sprocket, comprising a large central roller at the exit and entrance of film to a film magazine, said roller having thereon a high traction covering for transferring energy between said film and said large roller, a pair of rollers between which and said central roller said film is adapted to pass, spring axles for said pair of rollers to bias said rollers toward the axis of said central roller when film is between said central roller and said pair of rollers, and drive means for said central roller to advance said film out of and into said magazine at the same rate as said film is advanced by said sprocket.

JAMES L. PETTUS.

REFERENCES CITED

The following references are of record in the file of this patent:

UNITED STATES PATENTS

| Number | Name | Date |
|---|---|---|
| 1,336,640 | Leonard | Apr. 13, 1920 |
| 1,863,066 | Owens | June 14, 1932 |
| 1,926,703 | Spence | Sept. 12, 1933 |
| 2,055,113 | Tondreau | Sept. 22, 1936 |
| 2,061,177 | Tasker | Nov. 17, 1936 |
| 2,152,369 | Whittaker | May 28, 1939 |
| 2,362,019 | Moore | Nov. 7, 1944 |

FOREIGN PATENTS

| Number | Country | Date |
|---|---|---|
| 371,326 | Germany | Mar. 13, 1923 |